US011570757B2

(12) United States Patent
Panteleev et al.

(10) Patent No.: US 11,570,757 B2
(45) Date of Patent: Jan. 31, 2023

(54) SIDELINK COLLISION AVOIDANCE, HARQ FEEDBACK, AND CSI ACQUISITION

(71) Applicant: Intel Corporation, Santa Clara, CA (US)

(72) Inventors: Sergey Panteleev, Nizhny Novgorod (RU); Alexey Khoryaev, Nizhny Novgorod (RU); Mikhail Shilov, Nizhny Novgorod (RU); Kilian Peter Anton Roth, Munich (DE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/253,018

(22) PCT Filed: Nov. 1, 2019

(86) PCT No.: PCT/US2019/059449
§ 371 (c)(1),
(2) Date: Dec. 16, 2020

(87) PCT Pub. No.: WO2020/092939
PCT Pub. Date: May 7, 2020

(65) Prior Publication Data
US 2021/0127364 A1    Apr. 29, 2021

Related U.S. Application Data

(60) Provisional application No. 62/791,527, filed on Jan. 11, 2019, provisional application No. 62/754,840, filed on Nov. 2, 2018.

(51) Int. Cl.
H04W 72/02    (2009.01)
H04W 76/11    (2018.01)
(Continued)

(52) U.S. Cl.
CPC ........... *H04W 72/02* (2013.01); *H04L 1/1819* (2013.01); *H04L 5/0055* (2013.01); *H04W 4/40* (2018.02);
(Continued)

(58) Field of Classification Search
CPC ........... H04W 74/002; H04W 74/0816; H04W 72/02; H04W 72/0406; H04W 72/0446;
(Continued)

(56) References Cited

U.S. PATENT DOCUMENTS

2017/0280469 A1    9/2017    Park et al.
2020/0008030 A1*   1/2020    Kim .................. H04L 5/003
(Continued)

FOREIGN PATENT DOCUMENTS

WO    WO-2017026973 A1 *   2/2017    ............ H04W 72/02
WO    WO-2018039079 A1     3/2018
WO    WO-2018143786 A1     8/2018

OTHER PUBLICATIONS

"International Application Serial No. PCT/US2019/059449, International Preliminary Report on Patentability dated May 14, 2021", 9 pgs.
(Continued)

Primary Examiner — Rina C Pancholi
(74) Attorney, Agent, or Firm — Schwegman Lundberg & Woessner, P.A.

(57) ABSTRACT

A computer-readable storage medium that stores instructions for execution by one or more processors of a user equipment (UE). configure the UE for NR communication. The instructions cause the UE to decode sidelink control information (SCI). The SCI includes scheduling information and priority information. The scheduling information indicates time resource assignment and frequency resource assignment for sidelink data communications using a physical sidelink
(Continued)

shared channel (PSSCH). The instructions further cause the UE to detect that a transmission (Tx) of a first set of physical sidelink feedback channels (PSFCHs) would overlap in time with a reception (Rx) of a second set of PSFCHs. The first and second sets of PSFCHs include sidelink feedback control information for the sidelink data communications. The instructions further cause transmission of at least one PSFCH from the first set of PSFCHs or the second set of PSFCHs based on the priority information.

19 Claims, 5 Drawing Sheets

(51) Int. Cl.
*H04W 4/40* (2018.01)
*H04L 1/18* (2006.01)
*H04L 5/00* (2006.01)
*H04W 28/02* (2009.01)
*H04W 28/26* (2009.01)
*H04W 72/04* (2009.01)

(52) U.S. Cl.
CPC ....... *H04W 28/0268* (2013.01); *H04W 28/26* (2013.01); *H04W 72/0406* (2013.01); *H04W 72/0446* (2013.01); *H04W 72/0453* (2013.01); *H04W 76/11* (2018.02)

(58) Field of Classification Search
CPC ......... H04W 72/0453; H04W 4/40–48; H04W 28/0268; H04W 28/26; H04W 76/11; H04L 5/0055; H04L 5/0044; H04L 5/0053; H04L 1/1819
See application file for complete search history.

(56) References Cited

U.S. PATENT DOCUMENTS

| | | | |
|---|---|---|---|
| 2020/0137790 A1* | 4/2020 | Tang | H04L 5/0053 |
| 2020/0305176 A1* | 9/2020 | Hu | H04B 7/0456 |
| 2021/0037603 A1* | 2/2021 | Li | H04W 72/0446 |
| 2021/0160890 A1* | 5/2021 | Selvanesan | H04W 72/085 |

OTHER PUBLICATIONS

"International Application Serial No. PCT/US2019/059449, International Search Report dated Feb. 27, 2020", 3 pgs.

"International Application Serial No. PCT/US2019/059449, Written Opinion dated Feb. 27, 2020", 6 pgs.

"Updated feature lead summary for agenda item 7.2.4.1.2 Physical layer structures and procedure(s)", LG Electronics, R1-1812017, 3GPP TSG RAN WG1 Meeting #94bis, Chengdu, China, (Oct. 11, 2018).

Huawei, et al., "Sidelink PHY structure and procedure for NR V2X", R1-1810138, 3GPP TSG RAN WG1 Meeting #94bis, Chengdu, China, (Sep. 29, 2018).

* cited by examiner

SIDELINK COLLISION AVOIDANCE, HARQ FEEDBACK, AND CSI ACQUISITION

PRIORITY CLAIM

This application is a U.S. National Stage Filing under 35 U.S.C. 371 from International Application No. PCT/US2019/059449, filed Nov. 1, 2019 and published in English as WO 2020/092939 on May 7, 2020 which claims the benefit of priority to the following provisional applications:

U.S. Provisional Patent Application Ser. No. 62/754,840, filed Nov. 2, 2018, and entitled "SIDELINK PHYSICAL LAYER COLLISION AVOIDANCE, HYBRID AUTOMATIC REPEAT REQUEST (HARQ) FEEDBACK, AND CHANNEL-STATE INFORMATION (CSI) ACQUISITION;" and U.S. Provisional Patent Application Ser. No. 62/791,527, filed Jan. 11, 2019, and entitled "SIDELINK PHYSICAL LAYER PROCEDURES FOR COLLISION AVOIDANCE, HARQ FEEDBACK, AND CSI ACQUISITION."

Each of the above-listed applications is incorporated herein by reference in its entirety.

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, and fifth-generation (5G) networks including 5G new radio (NR) (or 5G-NR) networks, 5G-LTE networks, and 5G NR unlicensed spectrum (NR-U) networks. Other aspects are directed to systems and methods for sidelink collision avoidance (e.g., in broadcast, unicast, and groupcast communications), hybrid automatic repeat request (HARQ) feedback procedures, and channel state information (CSI) acquisition procedures.

BACKGROUND

Mobile communications have evolved significantly from early voice systems to today's highly sophisticated integrated communication platform. With the increase in different types of devices communicating with various network devices, usage of 3GPP LTE systems has increased. The penetration of mobile devices (user equipment or UEs) in modern society has continued to drive demand for a wide variety of networked devices in a number of disparate environments. Fifth-generation (5G) wireless systems are forthcoming and are expected to enable even greater speed, connectivity, and usability. Next generation 5G networks (or NR networks) are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

Potential LTE operation in the unlicensed spectrum includes (and is not limited to) the LTE operation in the unlicensed spectrum via dual connectivity (DC), or DC-based LAA, and the standalone LTE system in the unlicensed spectrum, according to which LTE-based technology solely operates in unlicensed spectrum without requiring an "anchor" in the licensed spectrum, called MulteFire. MulteFire combines the performance benefits of LTE technology with the simplicity of Wi-Fi-like deployments.

Further enhanced operation of LTE systems in the licensed as well as unlicensed spectrum is expected in future releases and 5G systems, including NR vehicle-to-everything (V2X) systems. Such enhanced operations can include techniques for sidelink collision avoidance (e.g., in broadcast, unicast, and groupcast communications), HARQ feedback procedures, and CSI acquisition procedures.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate aspects to enable those skilled in the art to practice them. Other aspects may incorporate structural, logical, electrical, process, and other changes. Portions and features of some aspects may be included in or substituted for, those of other aspects. Aspects set forth in the claims encompass all available equivalents of those claims.

Figure 1A:
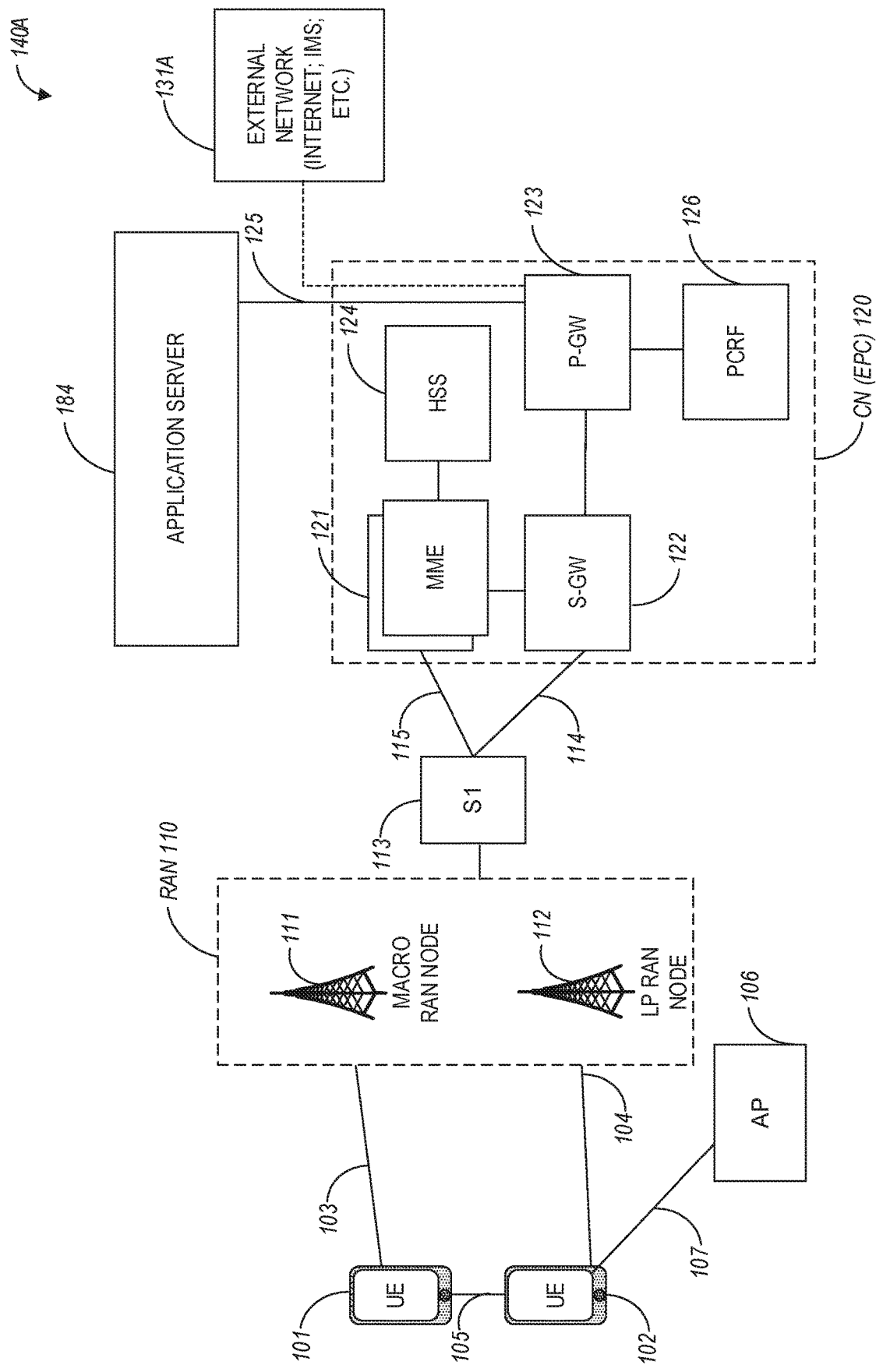
FIG. 1A illustrates an architecture of a network, in accordance with some aspects.

FIG. 1A illustrates an architecture of a network in accordance with some aspects. The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some aspects, carrier aggregation may be used where one or more component carriers operate on unlicensed frequencies.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHz and further frequencies).

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation Node-B (gNB), an evolved node-B (eNB), or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1I). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G network, including 5G new radio network using communications in the licensed (5G NR) and the unlicensed (5G NR-U) spectrum. One of the current enablers of IoT is the narrowband-IoT (NB-IoT).

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes as provided by 3GPP Technical Specification (TS) 23.501 (e.g., V15.4.0, 2018-12). In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
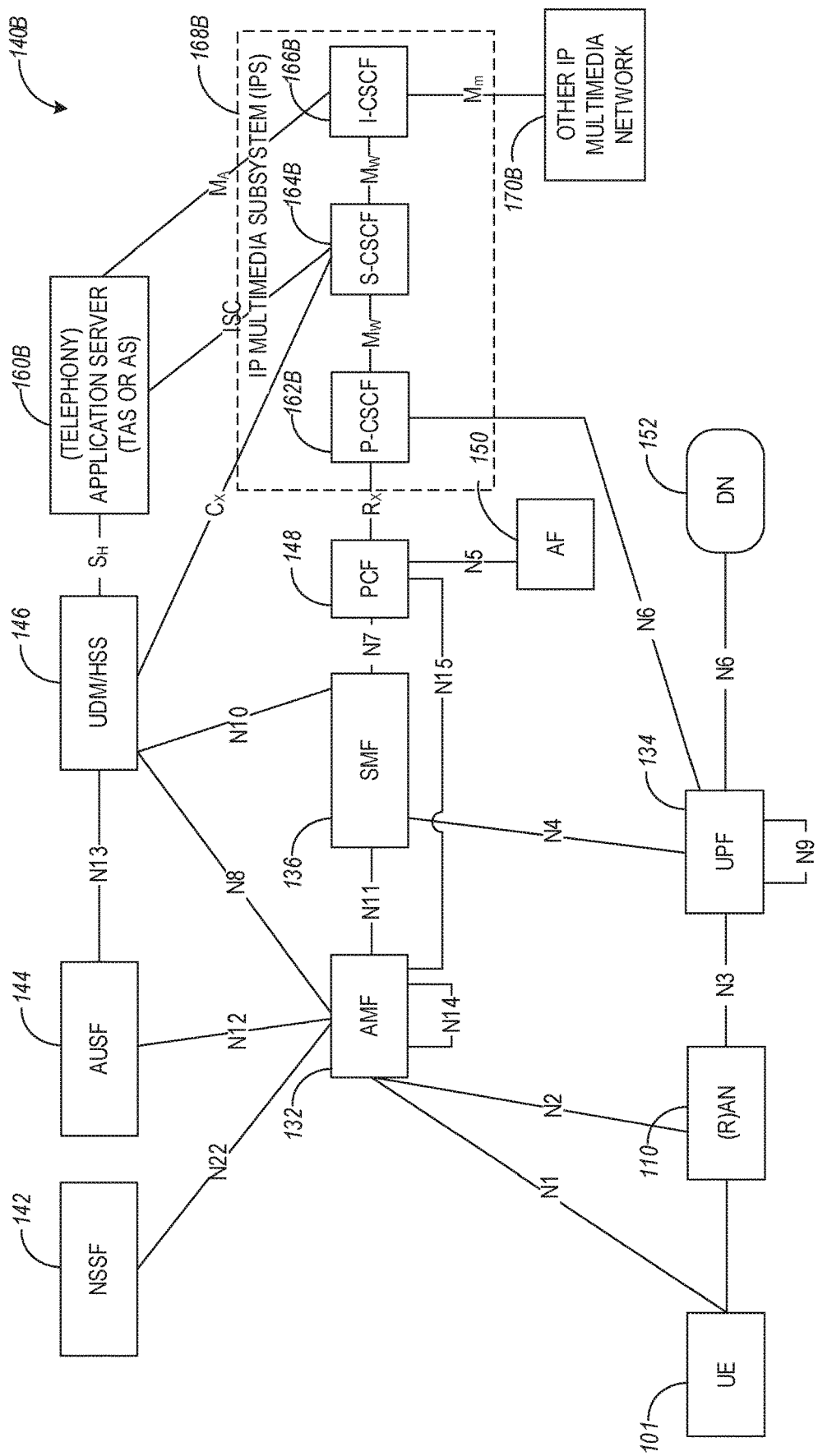
FIG. 1B and FIG. 1C illustrate a non-roaming 5G system architecture in accordance with some aspects.

FIG. 1B illustrates a non-roaming 5G system architecture in accordance with some aspects. Referring to FIG. 1B, there is illustrated a 5G system architecture 140B in a reference point representation. More specifically, UE 102 can be in communication with RAN 110 as well as one or more other 5G core (5GC) network entities. The 5G system architecture 140B includes a plurality of network functions (NFs), such as access and mobility management function (ANTE) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF 132 can be used to manage access control and mobility and can also include network slice selection functionality. The SMF 136 can be configured to set up and manage various sessions according to network policy. The UPF 134 can be deployed in one or more configurations according to the desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B, The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operators network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SWF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1E can also be used.

Figure 1C:
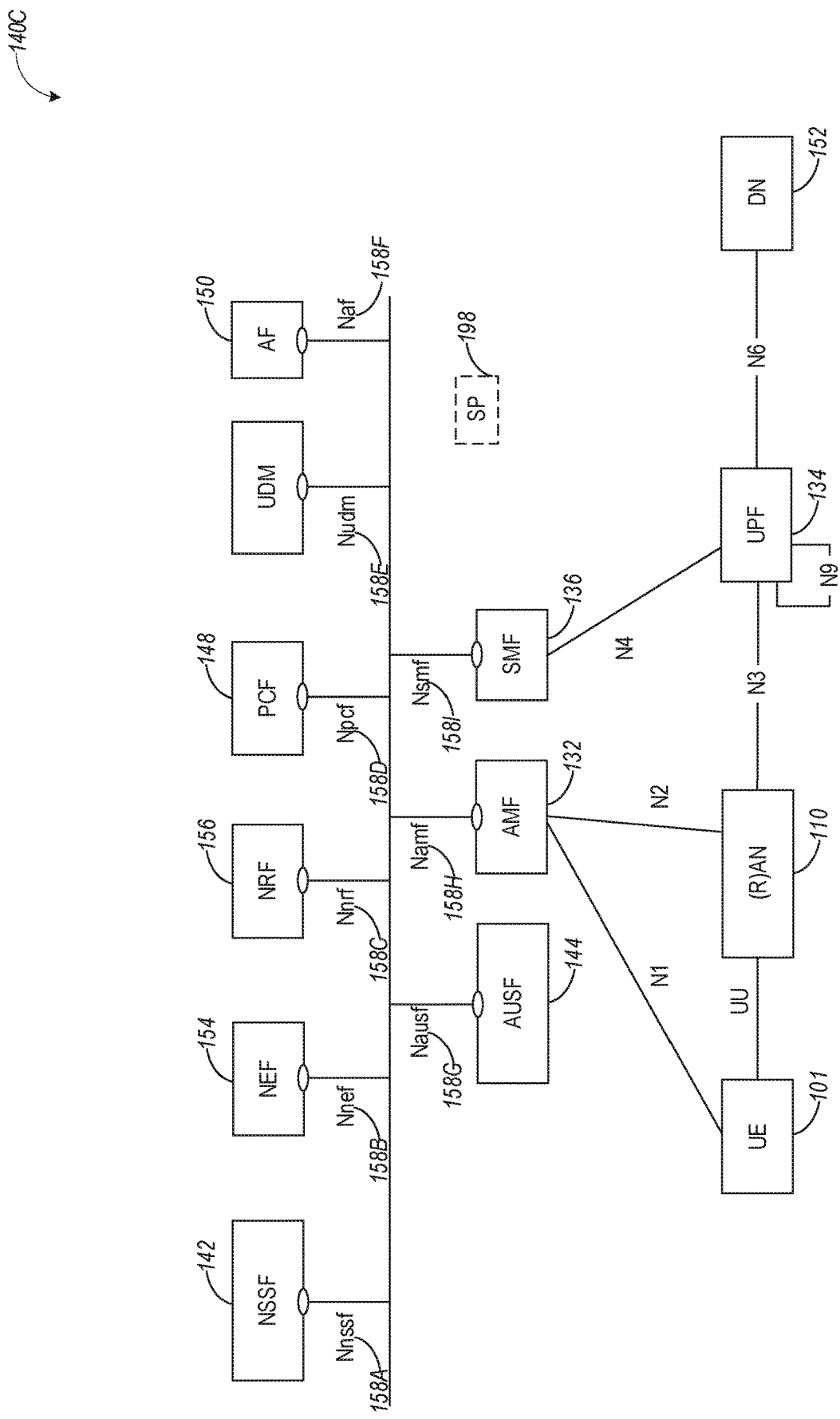

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

Techniques discussed herein can be performed by a UE or a base station (e.g., any of the UEs or base stations illustrated in connection with FIG. 1A-FIG. 1C).

It is expected that NR V2X communication systems will support a wide variety of use cases and deployment scenarios including basic safety message exchange, advanced driving applications, and extended sensor sharing. While basic safety applications may largely reuse LTE design of channel access based on sensing performed at the TX side, the advanced applications may require channel access schemes based on a combination of TX and RX based sensing to achieve higher data rates and reliability. Such new use cases may assume groupcast or unicast type of sidelink communication where the knowledge of intended message recipients may help in adapting transmit (TX) and receive (RX) behavior to select optimal resources in terms of system capacity and link performance.

In broadcast systems, there may be no accurate characterization of intended receivers and respective propagation channels that leads to the only approach for collision avoidance, which is transmitter based channel sensing for resource selection. Such an approach may be used as the scheme for Rel-14 V2V communications in LTE. It is also well recognized that such an approach does not directly ensure RX channel quality due to multiple challenges such as hidden node interference, in-band emission, and near-far problems.

The TX-based channel sensing scheme, if it is directly applied for unicast and groupcast operation, targeted to be supported by NR V2X, would substantially limit the achievable link reliability and spectrum efficiency due to the same problems of hidden node interference, in-band emissions, and near-far effects. Additionally, the intended receiver/group of receivers for unicast and groupcast may be assumed to be known due to pre-association, authorization, discovery procedures at least from a higher layer perspective. Therefore, such types of links may employ a more advanced collision avoidance scheme based on a combination of TX and RX based sensing.

The introduction of unicast links together with broadcast operation in the same spectrum requires considerations on seamless co-existence of both communication types. Therefore, at least introduction of unicast links into a broadcast system may not substantially degrade the performance of the broadcast system and/or performance of the unicast system in case of the mix with the broadcast system should not substantially degrade comparing to the unicast-only scenario. In order to ensure such co-existence, the distributed communication mode may be designed to take into account different types of links and may employ a unified channel sensing approach and control signaling design. Techniques discussed herein relate to the following components of unicast and groupcast communication for V2V: procedures for avoiding half-duplex collisions in groupcast and unicast communication, sidelink HARQ feedback procedures, and CSI acquisition procedures.

Half-duplex Collision Management.

In some aspects, there could be more than one group where a UE holds membership. The groups may either be dynamically formed (e.g., a coordinated maneuver, sensor sharing) or be relatively semi-static (e.g., platooning). Due to the fact that the group may be very dynamic, context setup for every group may impose a significant overhead. Therefore, the "connection-less" groupcast communication may be more suitable for the NR V2X design assumption. Following the connection-less paradigm of groupcast communication, differences with broadcast type of communication can be minimized while optimizing the performance for this specific communication type.

The resource collision for transmission and reception may be managed. For example, more than one member of a group transmitting data towards other members in the same resource may be avoided. Such collided transmissions may not only interfere at a receiver, but they may also lead to the cases where the transmitting UEs miss each other transmissions without chances for retransmission. The following high-level mechanisms can be used to solve the intra-group collision issues, classified as proactive (i.e., to prevent collisions) and reactive (i.e., to resolve collisions):

"Proactive" Half-Duplex Collision Management Type.

Higher layer floor control. In some aspects, a floor control function at higher layers can be used, which precludes simultaneous message transmissions within a UE group.

Group resource management. In some aspects, there may be a group member ID management function that ensures the UEs in the group know each other's unique group member ID so that these IDs may be unambiguously mapped to transmission resources in time domain multiplexing manner. For example, a simple function would be for a given unique member ID 'j', the logical time domain resource index in a pool 'i' may be calculated as i=j mod $N_{RES}$, where $N_{RES}$ is the number of orthogonal time-domain logical resources in a pool selected by this group. If the unique member IDs are not managed so that the resulting 'i' is unique, the member IDs may be first mapped to a continuous set of indexes by sorting the group member IDs. In another example, this resource management may be performed by the UE in the first initiating transmission which then may announce the group resources at the beginning of its transmission session.

Channel access resource selection avoiding group collisions. Given that the group management functions may operate at a relatively long time scale due to higher layer exchange, a lower layer collision avoidance mechanism may be needed for the faster time scale operation. In one example, the half-duplex collisions may be minimized during resource selection procedures so that time-domain resources known (from prior PSCCH/PSSCH transmissions) to be used by group members are given lower priority/weight for selection.

Figure 2:
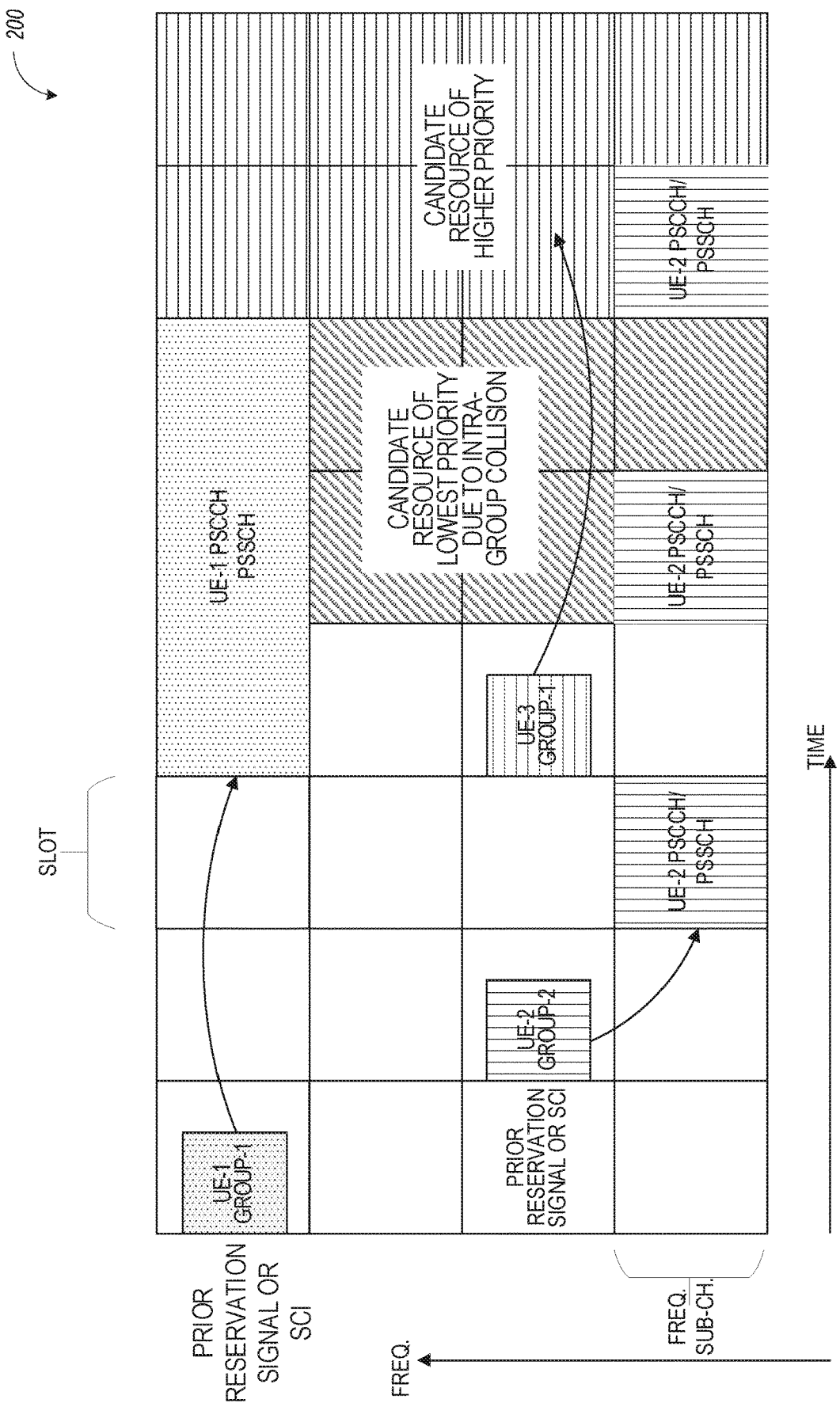
FIG. 2 illustrates group-collision-aware channel access and resource selection, in accordance with some aspects.

FIG. 2 illustrates group-collision-aware channel access and resource selection 200, in accordance with some aspects. For example, as illustrated in FIG. 2, if there are near equally loaded resources in two different slots and one of the slots is known to be also used for group member transmission, the slot(s) without group member transmissions or with a minimized number of group member transmissions may be prioritized for selection.

Techniques discussed herein below relate to "reactive" half-duplex collision management type and RX side collision indication. Another option to resolve half-duplex collisions in a group is to enable UE(s) which detect multiple simultaneous transmissions towards the same group ID to send a negative acknowledgment (NACK) or to send a dedicated signal with collision announcement.

In the case of NACK, there is no special signal and procedure needed other than the specified HARQ procedure. However, in this case, the UE sending a NACK would need to do it more than once and potentially simultaneously, depending on exact procedures. In this regard, the HARQ procedures may need to be flexible enough to handle transmission of HARQ-ACK to multiple group members. For example, the RX UE may need to be able to time-division multiplex (TDM) the responses or to multiplex them in a single sidelink feedback control information (SFCI) message. In particular, the HARQ-ACK message may be associated with a group ID, and a reserved state of HARQ-ACK codebook may indicate the NACK regardless of particular source of the transmission.

If a special signal is designed to announce the collisions, it could be transmitted once and be associated with the group ID and time instance of collision detection. If a TX UE knows there was a collision, the retransmission may be sent with redundancy version 0 (RV0) instead of on changing the RV (e.g., to RV2) that would increase self-decodability of the ReTX.

ACK signaling from group members. In case the transmitting UE knows all the group members and expects both ACK and NACK to be detected from all the members, it may detect a discontinuous transmission (DTX) in case a half-duplex collision happened. The DTX would mean one of the UEs have not detected both control and data. Therefore, the retransmission may need to be performed. Again, similar to the discussion on the dedicated collision announcement signal above, the ReTX may be sent with self-decodable RV0.

In some aspects, at least one proactive and at least one reactive mechanism may be designed in order to ensure high reliability requested by the NR V2X advanced use cases. Moreover, multiple proactive and multiple reactive mechanisms may be combined in order to have a multi-stage collision avoidance architecture.

Techniques discussed herein below relate to sidelink HARQ feedback procedures, including adaptiveness and synchronicity. The HARQ retransmission may be designed asynchronous in a sense that is may come in arbitrary timing relationship with the initial transmission. This may be helpful to keep flexibility in resource allocation so that the resources are selected according to common channel access procedures and avoiding any semi-statically or dynamically reserved/prohibited resources.

Having asynchronous retransmission, it is natural that it may be scheduled by a new instance of SCI/PSCCH and linked with the previous TX by a HARQ ID. Having a new instance of SCI may be straightforward to allow the change of transmission parameters and resource allocations in order to be able to adapt to changing radio environments and/or increase/decrease SE of retransmissions keeping the TBS assumption consistent between different occasions. Therefore, adaptive HARQ retransmission behavior as currently assumed in NR DL and UL may be supported for sidelink communication.

Overall, the adaptive and asynchronous HARQ retransmission may include anew data indicator (NDI) and HARQ process ID fields in SCI scheduling PSSCH. In addition, explicit redundancy version (RV) indication may also be used to keep the same understanding of the RV index between TX and RX UEs in cases of missed preceding transmissions.

Techniques discussed herein below relate to retransmission resource allocation. The basic principle of channel access is to avoid transmission on resources known to be used by other UEs (subject to measurements and QoS). In aperiodic traffic, it may be possible especially when a single transport block (TB) is transmitted using more than one slot/TTI so that initial slot may indicate the repetition resources to be avoided by other UEs.

However, when HARQ feedback is employed, a processing approach (under ideal feedback assumption) may be to use a minimum number of slots/TTIs for initial transmission and only allocate retransmission in case of NACK/DTX. In this regard, the principle of resource reservation may not work since there may be no information about retransmissions triggered by feedbacks if the potential retransmissions are not reserved in advance.

In that context, in one embodiment, for feedback based HARQ retransmissions, a transmitting UE should indicate/reserve retransmission resources prior to or during the initial transmission. In a simple resource selection approach, the indicated retransmission resources may be considered as occupied in the same way as blind repetitions. However, the following different approach may be applied to retransmission resources assuming those may not be utilized in case of successful reception:

In one option, during resource selection procedures, a UE may consider feedback based retransmission resources as having a higher priority to be selected under other equal/similar assumptions, e.g., similar measurement and QoS metrics. Alternatively, if the priority/QoS of service is highly demanding, the retransmission resources may be excluded with even bigger certainty assuming ReTX is the last chance for a UE to deliver the service, and therefore it should not interfere.

In another option, consider feedback based retransmission resources as occupied until other indication overriding this assumption is received. For example, if SFCI carrying ACK for this transport block is received, or if SCI scheduling new TB for this HARQ ID/group ID is received.

In some aspects, slot aggregation may still be combined with feedback based retransmissions so that the feedback is only expected after the whole bundle, not after every repetition.

In another related embodiment, configuration signaling may be introduced to switch between different behaviors where the feedback based retransmissions resources are signaled or not signaled in advance. Furthermore, the decision to reserve feedback based retransmission resources may be also based on QoS parameters and/or congestion control outcome so that more demanding/reliable service may signal retransmission resources in advance to protect those.

Techniques discussed herein below relate to feedback timing and resources. The feedback information (standalone or part of other control information, and denoted as sidelink feedback control information, or SFCI) may either be sent with fixed timing relation to the acknowledged PSSCH or with dynamically/semi-statically indicated timing relation.

In one embodiment, dynamic (asynchronous) timing relation may allow UE(s) to perform channel access for the feedback itself or to dynamically take into account the already planned feedback resources and select the more suitable/less congested one for its own operation. That may especially be useful in a mixed scenario of different services, like unicast/groupcast and broadcast wherein the latter does not require any feedback to be sent. Under his assumption, it also needs to be decided where the feedback resource and timing are determined: at TX or RX (with possible restriction from TX).

If the TX UE determines the feedback resources then the feedback resources may be avoided by others when there is sufficient processing time, once the SCI scheduling PSSCH is detected by the surrounding UEs. Additionally, this option may be suitable for groupcast HARQ if the NACK transmission is expected in the same resource from multiple PSSCH receivers. In particular, if the feedback resource is conveyed in SCI scheduling PSSCH, the same resource may be applied by all group receivers, otherwise, multiple resource may be selected by the receiver in individual manner.

If the RX UE determines the feedback resources, those could be selected taking into account current operation at the RX UE, for example, its own plans to transmit PSSCH and PSCCH, sensing information, etc. Moreover, this option may be combined with RX assistance information sending. As a kind of hybrid mode, the TX UE may indicate a set of preferred feedback resources and the RX UE may select one of them.

In some aspects, the HARQ feedback may not be needed, e.g., for broadcast or in case unicast may suffice with higher layer feedback. In this case, it is natural to support the case when SFCI resource is not provided that effectively means no HARQ feedback requested. In one embodiment, a reserved or invalid state of SFCI resource indication may indicate that no HARQ-ACK feedback is requested from the transmitter.

In some aspects, the time-frequency resource for SFCI may be selected by the transmitting UE using channel access procedures. For example, the resources known to be used by other UEs may be avoided.

In one embodiment, when SFCI resource is added to the candidate resource set, RSRP measured on PSCCH/PSSCH of the UE requesting the SFCI transmission may be used. In a more advanced approach, if the receiver UE is identifiable at surrounding UEs, those may apply RSRP measured from this UE in previous procedures, or the other UEs may put RSRP on useful link to SCI so that surrounding UEs can calculate hypothetical SINR at potentially collided resource for smarter decision.

In some aspects, the feedback from RX may also be transmitted subject to one or more of the following conditions:

TX-RX or TX-TX collisions with other procedures. In this case, whether to perform SFCI/PSFCH transmission may be subject to dropping rules based on quality of service (QoS) indicators and congestion control. The QoS indicators here are compared from the traffic requesting feedback transmission and the QoS of the other procedure in conflict, which may be either monitoring of higher priority traffic/signal or transmitting higher priority traffic/signal.

Techniques discussed herein below relate to congestion control functions. The congestion situation may be seen differently on the TX and RX sides, therefore a decision to send SFCI may also be made at the RX side by refusing to transmit it.

In some aspects, resource selection for SFCI may be randomized in some window so that UEs transmitting data at the same time may randomize collisions. UEs transmitting in later time should be able to avoid these resources by control channel decoding.

Techniques discussed herein below relate to feedback information. In a distributed communication system, the collisions may not be under full control and may happen on every channel, although the collision probability may depend on loading conditions. In that sense, the situations where transmission is erroneously considered successful at TX side due to collisions in feedback channel should be minimized, since these situations may only be resolved by higher layer retransmissions at substantially larger timescale. At the same time, typically the first transmission should be successful in majority of cases (e.g. 90%) in order to achieve stable operation with larger SE comparing to a system w/o feedback.

In case the transmitter assigns SFCI resources, there may be no need to carry HARQ process ID or source ID in the feedback. However, considering collision probability, it may still be instrumental to the UE to know the ID of the source of the detected feedback. Moreover, if the SFCI resource is refined or determined by the RX UE, the feedback should be also associated with an ID so that TX UE understands the source of the feedback and the HARQ process.

The following categories of HARQ-ACK feedback message content can be identified: Category 1: HARQ-ACK bit(s) only for one or multiple transport blocks; Category 2: HARQ-ACK bit(s) and corresponding HARQ process ID(s); Category 3: HARQ-ACK bit(s) and corresponding group/destination ID(s); and Category 4: HARQ-ACK bit(s), corresponding HARQ process ID(s), and corresponding group/destination ID(s).

In some aspects, if multiple feedbacks are requested to be transmitted at the same time, besides multiplexing, dropping procedures may be defined. In one embodiment, a dropping rule may be defined so that the lower effective priority PSSCH acknowledgment is dropped while the higher effective priority PSSCH acknowledgment is performed. The effective priority here may be mapped from the L1/L2 quality of services attributes which comprise at least priority, reliability, latency, and communication range.

In other aspects, also applicable to the case of identical effective priorities, NACK transmission may be prioritized over an acknowledgment (ACK), and the ACK is dropped. Alternatively, the NACK may be dropped assuming it may be detected as DTX and retransmitted again.

For groupcast, although the NACK-only reporting is attractive in terms of system overhead, it may be inefficient for groupcast operation when a receiver does not even detect the transmission (e.g. due to half-duplex or strong interference). In order to avoid such issues, both states may be reported. To manage the reporting overhead, two different resources may be used for ACK and NACK respectively, especially when PSFCH carrying SFCI has PSCCH structure. In that case, if NACK is detected or if no ACK is detected, the transmitter may decide to schedule retransmission.

In some aspects, the linkage between the two resources may need to be established in order to keep SCI signaling the same as for a single resource.

In some aspects, two resources may be multiplexed in the time domain (in different slots) so that there is minimized in-band emission and de-sensitivity impact when UE tries to receive both ACK and NACK. The NACK resource may be placed before the ACK in order to organize retransmission as soon as possible.

In some aspects, two resources may be multiplexed in the frequency domain in the same slot. In an enhanced version, the ACK transmission may be performed with less power so that NACK resource is less masked by nearby high-power responses. The power backoff may also be a function of measured RSRP at the receiver during PSSCH or PSCCH processing.

In case of frequency or code-domain multiplexing of feedbacks in the same slot, power controlled transmissions may be employed in order to minimize near-far/in-band emission/de-sensitivity effects. In one embodiment, the receiver may apply open loop power control based on the compensation of path gain to the detected source of PSCCH/PSSCH with specific P0 and alpha settings.

Techniques discussed herein below relate to multiplexing and physical structure. In this section, discussion on the physical channel for HARQ feedback and multiplexing with other channels is presented. First, the potential payload of such a message may need to be determined. Given the discussion above, the feedback message may at least carry a HARQ-ACK which is one or more bits depending on multiplexing/bundling of the feedbacks for different transport blocks and carry a UE identity. As a result, in case the feedback is fully asynchronous, the payload size may be composed of HARQ-ACK+HARQ ID+UE ID which may be estimated as ~[1-2]+4+[8-16] bit. Here, the HARQ-ACK is assumed to carry at most two transport block bits, the HARQ ID is assumed to be at most 4 bit (16 processes), and the UE ID may be in range of 8 bit (as in Rel-12 ProSe) to 16 bit (as an RNTI). In some aspects, HARQ-ACKs from different PSSCH transmissions may be requested to be multiplexed in the same SFCI occasion that would require more payload.

Another consideration is concerned with the physical channel dimensions and resources. Sending feedback shorter than a slot may impact AGC procedures which are typically performed at slot boundaries. That would require to either consider more than one AGC adjustment event within a slot and/or to perform feedback transmission using full slot transmission. As a result, the following two options of standalone SFCI transmission may be used:

Techniques discussed herein below relate to long PSCCH for SFCI. This PSCCH format may be designed similar to Rel-14 SCI transmission using a narrow 1-2 PRB structure spanning the full slot (excluding necessary switching gaps and reserved/unavailable symbols). With this structure, the resources for transmission may be selected following the same procedures as for shared channels.

Techniques discussed herein below relate to short PSCCH for SFCI. This PSCCH format may be designed in a common framework with PSCCH carrying SCI. It may span 2-8 PRB and 2-3 OFDM symbols. In some aspects, it may span 1-2 PRBs and 1-2 OFDM symbols. In some aspects, the SFCI may be carried by a physical sidelink feedback channel (PSFCH). The control resource set for all PSCCH formats may be either commonly configured or be separately configured. As a result, the PSCCH carrying SFCI and PSCCH carrying SCI may be monitored in the same/overlapping resource set or in different resource sets.

Techniques discussed herein below relate to HARQ feedback in Mode-1. In some aspects, the HARQ feedback on sidelink follows a common procedure with Mode-2 UEs. Therefore, sending the feedback to the TX side is necessary and thus sending the reception status directly from RX UE to gNB may be redundant. Moreover, sending reception status to gNB may be limited only to cases of same serving cell and connected mode for the RX UE leading to unjustified complicated procedures.

Besides precluding to send HARQ-ACK to gNB from RX, the sharing of HARQ feedback with gNB may also be unjustified. In order to enable sensing operation, potential HARQ retransmission resources should be signaled with every (re)transmission. For seamless Mode-1 and Mode-2 coexistence, this principle may be used in Mode-1. Thus, even for feedback-based operation, the resources for potential retransmission need to be signaled to a UE once scheduling initial transmission. This may eliminate the need for sharing HARQ feedback with gNB.

In addition to signaling resources for retransmissions, it may be still instrumental to enable fast request for retransmission resources from gNB. For this purpose, signaling of full HARQ feedback with ACK and HACK states per each HARQ process may complicate system design with marginal benefits expected. HARQ codebook re-design may be needed to handle this while the usefulness of ACK may be unclear.

In order to request retransmission resources, the TX may send SR on one or more SR configurations. Multiple configurations mapped to different LCH were already introduced in Rel-15 NR, thus it may be straightforward to reuse this mechanism. When PUSCH is scheduled at the same time, usual BSR may be appended to it. In one embodiment, one or more than one SR configuration configured for transmission on PUCCH may be associated with request of sidelink Mode-1 transmission and be also associated with sidelink LCHs. The SR may be triggered not only if there is no valid BSR sent but also if there are HARQ retransmission pending at a UE.

Techniques discussed herein below relate to CSI acquisition, including aspects relating to resources for measurements. The link adaptation based on CSI acquisition may consider the inherently mobile environment and changing interference. These considerations may substantially limit the functionality needed for CSI framework in sidelink V2V communication. In some aspects, SL transmissions may be subject to channel access procedures. In that sense, standalone CSI-RS transmission or periodic CSI-RS transmission may violate this principle. Therefore, it may be beneficial to apply common resource allocation mechanisms to the signals for CSI acquisition.

In one option, there may be no dedicated CSI-RS introduced in sidelink and all measurements could be performed using DM-RS carried with PSCCH and/or PSSCH. A scheme based on DM-RS pre-coder cycling known to the receiver may allow estimating CQI and RI with good accuracy. For that purpose, the precoder/PMI application (alternation or cycling rule) and rank of the transmission may be indicated in SCI scheduling PSSCH. The granularity of precoder application to PSSCH and DMRS also needs to be signaled.

Another option may require the allocation of dedicated CSI-RS signals which may also be carried together with PSCCH and/or PSSCH. In this case, the CSI-RS bandwidth may be different from the PSCCH/PSSCH bandwidth in order to be able to perform wideband estimation. However, resources for such transmission may need to be reserved in the system to avoid mismatched measurements due to collisions with other CSI-RS or other physical channels. This option may also use a PSCCH to indicate the presence of CSI-RS.

A system and method of unicast, groupcast vehicle-to-vehicle (V2V) communication in a fifth-generation (5G) or new radio (NR) system are disclosed. The method may include transmitting, by a first UE, of control and/or shared channel; transmitting, by a second UE, of feedback in response to the control and/or shared channel; and avoiding, by a UE, of half-duplex collision with other UEs in a group. The half-duplex collisions within a group may be avoided by a higher layer floor control mechanisms. The half-duplex collisions within a group may be avoided by a group member ID management function and its mappings to resource ID. The half-duplex collision within a group may be minimized during resource selection procedures so that time resources known (from prior PSCCH/PSSCH transmission) to be used by group members are given lower priority/weight for selection. The half-duplex collisions within a group may be resolved by sending NACK to the colliding UEs by other UEs detected the collision. The half-duplex collision within a group may be resolved by sending a dedicated collision announcement signal by others UEs detected the collision.

The sidelink control information (SCI) at least carries HARQ ID, NDI, and RV index. Time-frequency resource for sidelink feedback control information (SFCI) is carried in SCI. The SFCI resource is detected by UEs not interested in sending SFCI for this PSSCH but interested in avoiding to use this resource for its own operations. The SFCI resource is determined by the receiving UE in a window known to the transmitting UE. The following categories of HARQ feedback payload may be used to send feedback: Category 1: HARQ-ACK bit(s) only for one or multiple transport blocks; Category 2: HARQ-ACK bit(s) and corresponding HARQ process ID(s); Category 3: HARQ-ACK bit(s) and corresponding group/destination ID(s); and Category 4: HARQ-ACK bit(s), corresponding HARQ process ID(s), and corresponding group/destination ID(s).

Feedback dropping and multiplexing may be defined in case of multiple triggered feedbacks at the same time resource. The dropping rule may be defined so that the lower effective priority PSSCH acknowledgment is dropped while the higher effective priority PSSCH acknowledgment is performed. A short PSCCH format may be defined to convey SFCI, where it comprises 2-8 PRB in frequency domain and 2-3 symbols in time domain. A long PSCCH format may be defined to convey SFCI, wherein it comprises 1-2 PRB in frequency domain and up to 14 symbols in time domain excluding necessary switching gaps and reserved/unavailable symbols. The control resource set for all PSCCH formats may be either commonly configured or be separately configured. As a result, the PSCCH carrying SFCI and PSCCH carrying SCI may be monitored in the same/overlapping resource set or in different resource sets. DMRS of PSSCH, PSSCH precoder cycling rule, and rank of PSSCH transmission is signaled in SCI.

For feedback based HARQ retransmissions, a transmitting UE may indicate/reserve retransmission resources prior to or during the initial transmission. During resource selection procedures, a UE may consider feedback based retransmission resources as having a higher priority to be selected under other equal/similar assumptions, e.g. similar measurement and QoS metrics. Alternatively, if the priority/QoS of service is highly demanding, the retransmission resources may be excluded with even bigger certainty assuming ReTX is the last chance for a UE to deliver the service, and therefore it may not interfere.

A UE may consider feedback based retransmission resources as occupied until other indication overriding this assumption is received, e.g. SFCI. When SFCI resource is added to the candidate resource set, RSRP measured on PSCCH/PSSCH of the UE requesting the SFCI transmission may be used. Whether to perform SFCI/PSFCH transmission may be subject to dropping rules based on QoS indicators and congestion control by comparing QoS indicators from the traffic requesting feedback transmission and the QoS of the other procedure in conflict, which may be either monitoring of higher priority traffic/signal or transmitting higher priority traffic/signal.

For groupcast HARQ feedback reporting, two different resources may be used for ACK and NACK respectively. The two resources may be multiplexed in time domain (in different slots) so that there is minimized in-band emission and de-sensitivity impact when UE tries to receive both ACK and NACK. The NACK resource may be placed before the ACK in order to organize retransmission as soon as possible. The two resources may be multiplexed in frequency domain in the same slot. In an enhanced version, the ACK transmission may be performed with less power so that NACK resource is less masked by nearby high-power responses. In gNB-controlled sidelink transmission mode-1, resources for potential retransmissions need to be signaled to a UE once scheduling initial transmission. One or more than one SR configuration configured for transmission on PUCCH may be associated with request of sidelink Mode-1 transmission and be also associated with sidelink LCHs. The SR may be triggered not only if there is no valid BSR sent but also if there are HARQ retransmission pending at a UE.

Figure 3:
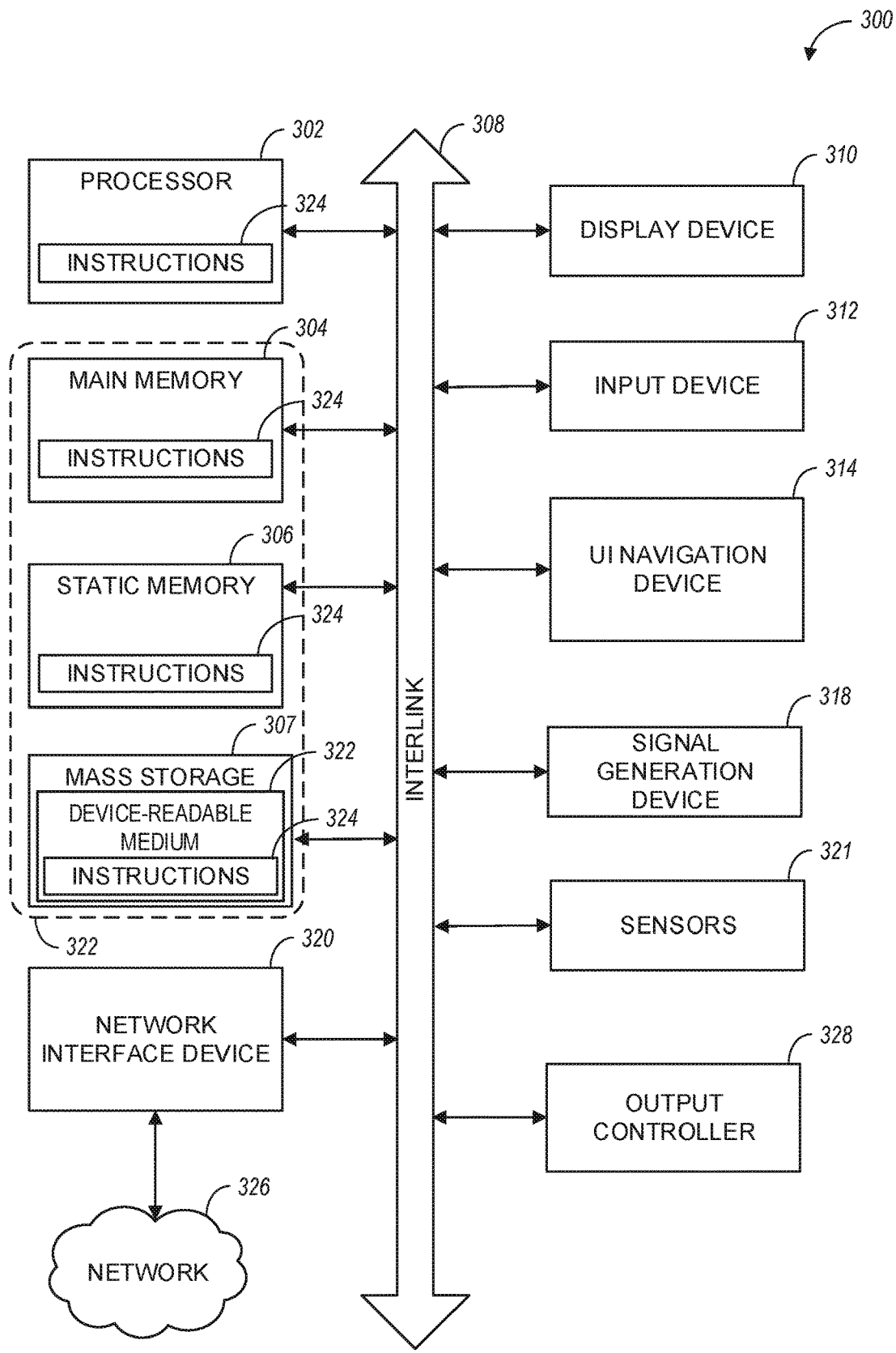
FIG. 3 illustrates a block diagram of a communication device such as an evolved Node-B (eNB), a new generation Node-B (gNB), an access point (AP), a wireless station (STA), a mobile station (MS), or a user equipment (UE), in accordance with some aspects.

FIG. 3 illustrates a block diagram of a communication device such as an evolved Node-B (eNB), a next generation Node-B (gNB), an access point (AP), a wireless station (STA), a mobile station (MS), or a user equipment (UE), in accordance with some aspects and to perform one or more of the techniques disclosed herein. In alternative aspects, the communication device 300 may operate as a standalone device or may be connected (e.g., networked) to other communication devices.

Circuitry (e.g., processing circuitry) is a collection of circuits implemented in tangible entities of the device 300 that include hardware (e.g., simple circuits, gates, logic, etc.). Circuitry membership may be flexible over time. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. For example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 300 follow.

In some aspects, the device 300 may operate as a standalone device or may be connected (e.g., networked) to other devices. In a networked deployment, the communication device 300 may operate in the capacity of a server communication device, a client communication device, or both in server-client network environments. In an example, the communication device 300 may act as a peer communication device in peer-to-peer (P2P) (or other distributed) network environment. The communication device 300 may be a UE, eNB, PC, a tablet PC, a STB, a PDA, a mobile telephone, a smartphone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. For example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using the software, the general-purpose hardware processor may be configured as respective different modules at different times. The software may accordingly configure a hardware processor, for example, to constitute a particular module at one instance of time and to constitute a different module at a different instance of time.

Communication device (e.g., UE) 300 may include a hardware processor 302 (e.g., a central processing unit (CPU), a graphics processing unit (GPU), a hardware processor core, or any combination thereof), a main memory 304, a static memory 306, and mass storage 307 (e.g., hard drive, tape drive, flash storage, or other block or storage devices), some or all of which may communicate with each other via an interlink (e.g., bus) 308.

The communication device 300 may further include a display device 310, an alphanumeric input device 312 (e.g., a keyboard), and a user interface (UI) navigation device 314 (e.g., a mouse). In an example, the display device 310, input device 312 and UI navigation device 314 may be a touch-screen display. The communication device 300 may additionally include a signal generation device 318 (e.g., a speaker), a network interface device 320, and one or more sensors 321, such as a global positioning system (GPS) sensor, compass, accelerometer, or another sensor. The communication device 300 may include an output controller 328, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.

The storage device 307 may include a communication device-readable medium 322, on which is stored one or more sets of data structures or instructions 324 (e.g., software) embodying or utilized by any one or more of the techniques or functions described herein. In some aspects, registers of the processor 302, the main memory 304, the static memory 306, and/or the mass storage 307 may be, or include (completely or at least partially), the device-readable medium 322, on which is stored the one or more sets of data structures or instructions 324, embodying or utilized by any one or more of the techniques or functions described herein. In an example, one or any combination of the hardware processor 302, the main memory 304, the static memory 306, or the mass storage 316 may constitute the device-readable medium 322.

As used herein, the term "device-readable medium" is interchangeable with "computer-readable medium" or "machine-readable medium". While the communication device-readable medium 322 is illustrated as a single medium, the term "communication device-readable medium" may include a single medium or multiple media (e.g., a centralized or distributed database, and/or associated caches and servers) configured to store the one or more instructions 324. The term "communication device-readable medium" is inclusive of the terms "machine-readable medium" or "computer-readable medium", and may include any medium that is capable of storing, encoding, or carrying instructions (e.g., instructions 324) for execution by the communication device 300 and that cause the communication device 300 to perform any one or more of the techniques of the present disclosure, or that is capable of storing, encoding or carrying data structures used by or associated with such instructions. Non-limiting communication device-readable medium examples may include solid-state memories and optical and magnetic media. Specific examples of communication device-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

The instructions 324 may further be transmitted or received over a communications network 326 using a transmission medium via the network interface device 320 utilizing any one of a number of transfer protocols. In an example, the network interface device 320 may include one or more physical jacks (e.g., Ethernet, coaxial, or phone jacks) or one or more antennas to connect to the communications network 326. In an example, the network interface device 320 may include a plurality of antennas to wirelessly communicate using at least one of single-input-multiple-output (SIMO), MIMO, or multiple-input-single-output (MISO) techniques. In some examples, the network interface device 320 may wirelessly communicate using Multiple User MIMO techniques.

The term "transmission medium" shall be taken to include any intangible medium that is capable of storing, encoding or carrying instructions for execution by the communication device 300, and includes digital or analog communications signals or another intangible medium to facilitate communication of such software. In this regard, a transmission medium in the context of this disclosure is a device-readable medium.

Although an aspect has been described with reference to specific exemplary aspects, it will be evident that various modifications and changes may be made to these aspects without departing from the broader scope of the present disclosure. Accordingly, the specification and drawings are to be regarded in an illustrative rather than a restrictive sense. This Detailed Description, therefore, is not to be taken in a limiting sense, and the scope of various aspects is defined only by the appended claims, along with the full range of equivalents to which such claims are entitled.

What is claimed is:

1. An apparatus for use in a user equipment (UE), the apparatus comprising:
    processing circuitry, wherein to configure the UE for New Radio (NR) sidelink communication, the processing circuitry is to:
        decode sidelink control information (SCI), the SCI including scheduling information and priority information, the scheduling information indicating time resource assignment and frequency resource assignment for sidelink data communications using a physical sidelink shared channel (PSSCH);
        detect that a transmission (Tx) of a first set of physical sidelink feedback channels (PSFCHs) by the UE would overlap in time with a reception (Rx) of a second set of PSFCHs by the UE, the first and second sets of PSFCHs including sidelink feedback control information for the sidelink data communications; and
        prioritize between transmission of at least one PSFCH from the first set of PSFCHs and reception of at least another PSFCH from the second set of PSFCHs during the overlap in time based on the priority information; and
    memory coupled to the processing circuitry and configured to store the SCI.

2. The apparatus of claim 1, wherein when the UE receives sidelink data, the processing circuitry is to:
    encode sidelink feedback control information (SFCI) for transmission via the first set of PSFCHs, the SFCI associated with the received sidelink data and the transmission via the first set of PSFCHs based on the priority information.

3. The apparatus of claim 1, wherein to cause the transmission, the processing circuitry is to:
    cause transmission of the first set of PSFCHs and drop reception of the second set of PSFCHs; or
    cause reception of the second set of PSFCHs and drop transmission of the first set of PSFCHs.

4. The apparatus of claim 1, wherein the SCI is received from a second UE via a physical sidelink control channel (PSCCH), wherein the SCI indicates sidelink resources from a sidelink resource pool reserved by the second UE, and wherein the processing circuitry is to:
    determine a set of candidate sidelink resources for reservation by the UE from the sidelink resource pool, the set of candidate sidelink resource divided into multiple time slots and frequency sub-channels, and being non-overlapping in time with the sidelink resources reserved by the second UE;
    encode second SCI for transmission via the PSCCH, the second SCI indicating a plurality of sidelink resources from the set of candidate sidelink resources that are being reserved by the UE; and
    encode a physical sidelink shared channel (PSSCH) for transmission, the PSSCH encoded to include a transport block mapped across the plurality of sidelink resources that are being reserved by the UE.

5. The apparatus of claim 4, wherein the processing circuitry is to:
    decode a destination ID within the SCI received from the second UE; and
    perform a determination whether the UE and the second UE are associated with a same UE group based on the destination ID.

6. The apparatus of claim 5, wherein the processing circuitry is to:
    determine the set of candidate sidelink resources of the UE based on the determination.

7. The apparatus of claim 5, wherein the processing circuitry is to:
    determine the set of candidate sidelink resources of the UE by minimizing a number of group member transmissions within the set of candidate sidelink resources by UEs in the same UE group, the group member transmissions using sidelink resources from the sidelink resource pool.

8. The apparatus of claim 4, wherein the processing circuitry is to:
    detect at least another SCI from a third UE, the SCI and the at least another SCI including a same group ID of a UE group; and
    encode a hybrid automatic repeat request negative acknowledgment (HARQ-NACK) message for transmission to the UE group to indicate receive (RX) side collision, the HARQ-NACK message including the group ID.

9. The apparatus of claim 4, wherein the processing circuitry is to:
    encode the second SCI to include a new data indicator (NDI), a redundancy version (RV) indication, and a hybrid automatic repeat request (HARQ) process ID, wherein the plurality of sidelink resources includes a reserved sidelink resource for a potential re-transmission of the transport block; and
    encode the PSSCH for re-transmission using the reserved sidelink resource, the re-transmission based on receiving a HARQ negative acknowledgment (HARQ-NACK) in response to the PSSCH transmission, and the PSSCH encoded to include the transport block and the HARQ process ID.

10. The apparatus of claim 1, further comprising transceiver circuitry coupled to the processing circuitry; and, one or more antennas coupled to the transceiver circuitry.

11. A non-transitory computer-readable storage medium that stores instructions for execution by one or more processors of a user equipment (UE), the instructions to configure the UE for New Radio (NR) sidelink communication, and to cause the UE to:
   decode sidelink control information (SCI), the SCI including scheduling information and priority information, the scheduling information indicating time resource assignment and frequency resource assignment for sidelink data communications using a physical sidelink shared channel (PSSCH);
   detect that a transmission (Tx) of a first set of physical sidelink feedback channels (PSFCHs) by the UE would overlap in time with a reception (Rx) of a second set of PSFCHs by the UE, the first and second sets of PSFCHs including sidelink feedback control information for the sidelink data communications; and
   prioritize between transmission of at least one PSFCH from the first set of PSFCHs and reception of at least another PSFCH from the second set of PSFCHs during the overlap in time based on the priority information.

12. The non-transitory computer-readable storage medium of claim 11, wherein when the UE receives sidelink data, the instructions further configure the UE to:
   encode sidelink feedback control information (SFCI) for transmission via the first set of PSFCHs, the SFCI associated with the received sidelink data and the transmission via the first set of PSFCHs based on the priority information.

13. The non-transitory computer-readable storage medium of claim 11, wherein to cause the transmission, the instructions further configure the UE to:
   cause transmission of the first set of PSFCHs and drop reception of the second set of PSFCHs; or
   cause reception of the second set of PSFCHs and drop transmission of the first set of PSFCHs.

14. The non-transitory computer-readable storage medium of claim 11, wherein the SCI is received from a second UE via a physical sidelink control channel (PSCCH), wherein the SCI indicates sidelink resources from a sidelink resource pool reserved by the second UE, and the instructions further configure the UE to:
   determine a set of candidate sidelink resources for reservation by the UE from the sidelink resource pool, the set of candidate sidelink resource divided into multiple time slots and frequency sub-channels, and being non-overlapping in time with the sidelink resources reserved by the second UE;
   encode second SCI for transmission via the PSCCH, the second SCI indicating a plurality of sidelink resources from the set of candidate sidelink resources that are being reserved by the UE; and
   encode a physical sidelink shared channel (PSSCH) for transmission, the PSSCH encoded to include a transport block mapped across the plurality of sidelink resources that are being reserved by the UE.

15. The non-transitory computer-readable storage medium of claim 14, wherein the instructions further configure the UE to:
   decode a destination ID within the SCI received from the second UE; and
   perform a determination whether the UE and the second UE are associated with a same UE group based on the destination ID.

16. The non-transitory computer-readable storage medium of claim 15, wherein the instructions further configure the UE to:
   determine the set of candidate sidelink resources of the UE based on the determination.

17. The non-transitory computer-readable storage medium of claim 15, wherein the instructions further configure the UE to:
   determine the set of candidate sidelink resources of the UE by minimizing a number of group member transmissions within the set of candidate sidelink resources by UEs in the same UE group, the group member transmissions using sidelink resources from the sidelink resource pool.

18. The non-transitory computer-readable storage medium of claim 14, wherein the instructions further configure the UE to:
   detect at least another SCI from a third UE, the SCI and the at least another SCI including a same group ID of a UE group; and
   encode a hybrid automatic repeat request negative acknowledgment (HARQ-NACK) message for transmission to the UE group to indicate receive (RX) side collision, the HARQ-NACK message including the group ID.

19. The non-transitory computer-readable storage medium of claim 14, wherein the instructions further configure the UE to:
   encode the second SCI to include a new data indicator (NDI), a redundancy version (RV) indication, and a hybrid automatic repeat request (HARQ) process ID, wherein the plurality of sidelink resources includes a reserved sidelink resource for a potential re-transmission of the transport block; and
   encode the PSSCH for re-transmission using the reserved sidelink resource, the re-transmission based on receiving a HARQ negative acknowledgment (HARQ-NACK) in response to the PSSCH transmission, and the PSSCH encoded to include the transport block and the HARQ process ID.

* * * * *